Patented June 11, 1940

2,204,358

UNITED STATES PATENT OFFICE 2,204,358

LAMELLAR TRISODIUM PHOSPHATE HYDRATE

Winfield W. Heckert, Wilmington, and James E. Kirby, Holly Oak, Del., assignors to E. I. du Pont de Nemours & Company, Wilmington, Del., a corporation of Delaware No Drawing. Application March 5, 1938, Serial No. 194,171

8 Claims. (Cl. 23—239)

This invention relates to the manufacture of compositions of matter comprising trisodium phosphate hydrate in the form of relatively large high bulking lamellae, and more particularly to compositions comprising trisodium phosphate hydrate in the form of thin, curly, semi-plastic flakes, and is further directed to processes for producing the above compositions by dissolving a crystallization inhibitor in molten trisodium phosphate hydrate and solidifying the molten material and forming high bulking lamellae.

Various processes are known in the art for flaking trisodium phosphate hydrate. In these processes the trisodium phosphate hydrate is melted in its water of crystallization and solidified on a suitably cooled surface to form a thin layer of film from which flakes are formed by means of a suitable knife or scraper. In one such process the melt is fed continuously to the surface of a rotating water-cooled drum from which the solidified material is flaked by means of suitable knives or scrapers.

In the operation of these processes it is necessary to make rather dense flakes in order to obtain a material which will not disintegrate into a powder when it is removed from the flaking drum. This powder formation is due to the fact that when the molten trisodium phosphate hydrate is chilled on the drum a brittle product is formed. Efforts to reduce the thickness of the flakes not only result in the production of a large quantity of this fine powder but also in a material reduction in the size of the flakes so that, irrespective of particular operating conditions, flakes having great bulk cannot be produced.

We have found that the brittleness of the solidified trisodium phosphate is due to crystallization during solidification and that by including a crystallization inhibitor in the molten trisodium phosphate hydrate crystallization may be retarded sufficiently so that the partially solidified material can be readily formed into various thin, bulky shapes without the formation of large quantities of powdered material. Thus by dissolving a crystallization inhibitor in molten trisodium phosphate hydrate, converting the molten material to a continuous thin, semi-solid film, and forming the film into lamellae of suitable high bulking shape, we are able to produce a material having greater bulk and greater resistance to mechanical abuse than heretofore possible and at the same time to avoid the disadvantage of the formation of large quantities of powdered material.

By converting the molten material containing a crystallization inhibitor on a water-cooled drum to a thin, semi-solid film and stripping the partially solidified material from the drum with suitable knives we are able to produce trisodium phosphate hydrate in the form of thin, curly, somewhat lace-like flakes bulking more than 70 cubic inches per pound. These flakes are entirely different in form and appearance from the ordinary flakes. The latter are stolid, flat, and somewhat brittle with little or no curvature except as may have been imparted by the curvature of the flaking drum, whereas the flakes of this invention are thin, curly, and somewhat lace-like in appearance. They are plastic as cut from the roll and quickly harden to strong flakes.

This difference in the character of the flakes may be attributable to the difference in the flaking procedure. Thus where the ordinary flakes were of necessity stripped from the flaking drum after complete solidification, the flakes of this invention are stripped while the film on the flaking drum is still in the semi-solid state. Thus the film tends to curl during stripping so that shapes entirely apart from the curvature of the drum are imparted to the resulting flakes.

Notwithstanding the thin, curly form of these flakes they offer superior resistance to mechanical abuse and may be packaged in cartons or barrels, shipped and handled under adverse conditions without any substantial reduction in size or the formation of powder.

Any substance which will inhibit, retard or prevent crystallization of molten trisodium phosphate hydrate or in effect plasticize the solidified trisodium phosphate hydrate may be employed in the processes of this invention. It is preferable to employ water-soluble materials so as not to interfere with the solubility of the trisodium phosphate hydrate. Suitable materials are compounds containing soluble $B_2O_3$ or $SiO_2$ such as alkali metal borates, boric acid, and alkali metal silicates. These substances when dissolved in molten trisodium phosphate hydrate operate to inhibit crystallization of the molten trisodium phosphate hydrate so that when a thin coat is applied to a flaking drum thin, curly flakes that are at first plastic and later harden may be readily obtained.

Preferably we employ oxygen compounds of boron containing soluble boron oxide ($B_2O_3$) such as boric acid, sodium tetraborate, sodium metaborate, sodium perborate, and complex borates. Complex borates such as borophosphates are available on the open market and are commonly referred to as inorganic resins. One such borophosphate corresponding by analysis to seven parts of borax ($Na_2B_4O_7 \cdot 10H_2O$) and three parts of mono-sodium phosphate monohydrate ($NaH_2PO_4 \cdot H_2O$) has been found to give very good results and may be used in place of an equal quantity of borax even tho the soluble boron oxide content is less.

These substances dissolved in the melt of trisodium phosphate hydrate in various amounts will inhibit the crystallization of trisodium phosphate hydrate sufficiently to permit the formation of thin, curly flakes which rapidly harden sufficiently to retain their shape and high bulking form. The amount required for this purpose is not particularly critical as satisfactory flakes may be obtained over a wide range. For example, satisfactory flakes have been obtained with melts containing 10, 12, 15, 20, and 25 per cent of borax.

It will, of course, be apparent to those skilled in the art that the water content of the melt should be maintained within certain limits to obtain satisfactory flaking. While this may be determined readily for any given set of conditions, we have found that satisfactory results may be obtained with melts containing from about 45 to 60 per cent of water. Ordinarily, better flakes are obtained with melts containing from about 53 to 55 per cent water, as with higher concentrations, that is, those containing much more than 57 per cent water, the flakes produced are somewhat damp.

While the water content of the melt may be varied by adding or evaporating water it is more expedient to select the ingredients for making up the melt having a proper degree of hydration. Thus a melt prepared with 15 per cent borax and 85 per cent trisodium phosphate dodecahydrate will contain 44.5 per cent solids and 55.5 per cent water.

While the amount of boron compound required may be readily determined for any particular operating conditions, we have found in general that satisfactory flakes may be obtained with melts containing from about 2.5 to 9 per cent of soluble $B_2O_3$. Where alkali metal borates are employed better flakes may be obtained with melts obtaining between 5 and 9 per cent of soluble $B_2O_3$, whereas with boric acid smaller amounts, that is, between about 2.5 and 5 per cent soluble $B_2O_3$, are more effective.

It will, of course, be apparent that during the flaking operation considerable water is lost and that the freshly prepared flakes will contain considerably less water than that specified for preparing the melt. Moreover, the flakes gradually lose water during storage. Consequently the composition of the flakes, insofar as the water content is concerned, will vary considerably from the composition of the melt. The relative proportion of the solids, however, will remain substantially the same. Thus for melts containing from 2.5 to 9 per cent soluble $B_2O_3$ it will be evident that the flakes produced will have a ratio of soluble $B_2O_3$ to $Na_3PO_4$ from 6:100 to 35:100.

The properties of the flakes produced with boron compounds naturally vary somewhat in accordance with the specific conditions obtaining, particularly with respect to the rate of flow of the melt to the drum and the speed of the drum, the rate of solidifying, moisture content, and the like. When, however, conditions are maintained such that a thin, curly flake is obtained, a bulkiness of from 70 to 80 cubic inches per pound or more may be readily obtained as compared with a maximum bulkiness of less than 60 cubic inches per pound for flakes obtainable from melts containing trisodium phosphate hydrate alone.

Flakes prepared according to the above procedure are also superior to ordinary flakes in that they do not lose water as readily or pick up carbon dioxide as rapidly as ordinary flakes when exposed to ordinary atmospheric conditions. This is illustrated by the following table:

| Composition of the melt | Water content | | | $CO_2$ content | | |
|---|---|---|---|---|---|---|
| | When prepared | After 1 week | After 26 days | When prepared | After 1 week | After 26 days |
| | Per cent | Per cent | Per cent | Per cent | Per cent | Per cent |
| Trisodium phosphate+ 10% borax | 43 | 41 | 37 | 1.2 | 1.2 | 2.0 |
| Trisodium phosphate alone | 50 | 31 | 22 | 0.8 | 1.6 | 5.5 |

Other crystallization inhibitors may be employed in a like manner and without any substantial variation in the procedures outlined above. Particularly good results may be obtained from the alkali metal silicates.

Silicates of various compositions may be employed. For example, we have obtained good results with sodium silicates having an $SiO_2$ to $Na_2O$ ratio of 0.97, 1.95, 3.25, and 3.9. Similarly good results have also been obtained with potassium silicates.

The amount of silicate required agrees very closely with the amount required of the alkali metal borates. Thus melts containing from 2.5 to 9 per cent soluble $SiO_2$ will produce satisfactory flakes. Likewise, the same considerations for the water content of the melt may be observed, tho better flakes appear to be obtained with melts containing 55 to 58 per cent water. The difference, however, is slight and may differ somewhat according to the particular conditions obtaining.

The product obtained from melts containing soluble $SiO_2$ has greater bulk than that produced from melts containing soluble $B_2O_3$. The bulkiness of the former may range from 85 to 95 cubic inches per pound or more as compared with the 70 to 80 cubic inches per pound for the latter and 55 to 60 cubic inches per pound for the product obtainable from trisodium phosphate alone.

Flakes containing soluble $SiO_2$, like the flakes containing soluble $B_2O_3$, also lose water and pick up carbon dioxide less rapidly than the regular flakes.

It is also possible to employ mixtures of silicates and borates under the conditions previously described. Any amount of the soluble $B_2O_3$ employed may be replaced by a like amount of soluble $SiO_2$. Thus, by suitable combinations of the two materials, it is possible to obtain flakes bulking from 70 to 95 cubic inches per pound or more as desired.

While we have disclosed our invention specifically with reference to the production of thin, curly flakes, it will be understood that numerous variations may be made in the form of the product without departing from the spirit of this invention. Crystallization inhibitors of this inventon may be employed to modify trisodium phosphate hydrate melts whenever it is desired to form the solidified material into particular shapes. This invention, however, is particularly advantageous for producing high bulking lamellae, as the lamellar form, being characterized as it is by one dimension being extremely small with respect to the other two and consequently by a high ratio of surface to mass, can be obtained only with difficulty by the processes heretofore available, and then only in the form of flat, plate-like flakes. By this invention lamellae may be formed in various high bulking shapes, such as the thin, curly flakes previously described, so as to impart great bulkiness to the product.

We claim:

1. In a process for flaking trisodium phosphate hydrate the method of obtaining thin, curly, flakes bulking more than 70 cubic inches per pound which comprises preparing a melt consisting essentially of an alkali metal borate, trisodium phosphate and water in proportions to give 5 to 9 per cent soluble $B_2O_3$ and about 50 to 60 per cent water, casting the melt into a thin, semi-solid film on a flaking drum and stripping the film from said drum while it is in a semi-solid state and amenable to plastic deformation whereby the film curls during stripping and breaks up into thin, curly flakes having a shape entirely distinct from the curvature of the flaking drum.

2. In a process for flaking trisodium phosphate hydrate the method of obtaining thin, curly, flakes bulking more than 70 cubic inches per pound which comprises preparing a melt consisting essentially of water, trisodium phosphate and a substance containing soluble $B_2O_3$ in proportions to give 2.5 to 9 per cent soluble $B_2O_3$ and about 45 to 60 per cent water, casting the melt into a thin film on a flaking drum and stripping the film from said drum while it is in a semi-solid state and amenable to plastic deformation whereby the film curls during stripping and breaks up into thin, curly flakes having a shape entirely distinct from the curvature of the flaking drum.

3. A flaked product composed essentially of trisodium phosphate, alkali metal borate, and water of crystallization having the composition which results from flaking a melt containing 5 to 9 per cent soluble $B_2O_3$ and about 50 to 60 per cent water and having the form resulting from casting the melt into a thin, semi-solid film on a flaking drum and stripping the film from said drum while it is in a semi-solid state and amenable to plastic deformation, said form characterizing the product as thin, curly, somewhat lace-like flakes bulking more than 70 cubic inches per pound.

4. A flaked product composed essentially of trisodium phosphate, alkali metal borate and water of crystallization having the composition which results from flaking a melt containing 2.5 to 9 per cent soluble $B_2O_3$ and about 45 to 60 per cent water and having the form resulting from casting the melt into a thin, semi-solid film on a flaking drum and stripping the film from said drum while it is in a semi-solid state and amenable to plastic deformation, said form characterizing the product as thin, curly, somewhat lace-like flakes bulking more than 70 cubic inches per pound.

5. A flaked product composed essentially of water of crystallization, trisodium phosphate and as the minor constituent a substance containing soluble $B_2O_3$ said product having the composition which results from flaking a melt containing 2.5 to 9 per cent soluble $B_2O_3$ and about 45 to 60 per cent water and having the form resulting from casting the melt into a thin, semi-solid film on a flaking drum and stripping the film from said drum while it is in a semi-solid state and amenable to plastic deformation, said form characterizing the product as thin, curly, somewhat lace-like flakes bulking more than 70 cubic inches per pound.

6. A flaked product composed essentially of trisodium phosphate, alkali metal borate and water of crystallization having a form characterizing the product as thin, curly, somewhat lace-like flakes bulking more than 70 cubic inches per pound and having an alkali metal borate content such that the product contains 12 to 35 parts soluble $B_2O_3$.

7. A flaked product composed essentially of water of crystallization, trisodium phosphate, and as a minor constituent a substance containing soluble $B_2O_3$ said product having a form characterizing it as thin, curly, somewhat lace-like flakes bulking more than 70 cubic inches per pound and having sufficient of said substance to provide 6 to 35 parts $B_2O_3$ for each 100 parts trisodium phosphate.

8. In a process for flaking trisodium phosphate hydrate the method of obtaining thin, curly flakes bulking more than 70 cubic inches per pound which comprises preparing a melt consisting essentially of water, trisodium phosphate and a substance selected from the class consisting of alkali metal silicates and alkali metal borates in proportions to give 2.5 to 9 per cent soluble $SiO_2$ or $B_2O_3$ and about 50 to 60 per cent water, casting the melt into a thin film on a flaking drum and stripping the film from said drum while it is in a semi-solid state and amenable to plastic deformation whereby the film curls during stripping and breaks up into thin, curly flakes having a shape entirely distinct from the curvature of the flaking drum.

WINFIELD W. HECKERT.
JAMES E. KIRBY.